US012806825B2

(12) United States Patent
Melvin et al.

(10) Patent No.: US 12,806,825 B2
(45) Date of Patent: Nov. 24, 2026

(54) EJECTION TABS FOR COMPRESSION MOLDING TOOLS AND PROCESSES

(71) Applicant: Arris Composites Inc., Berkeley, CA (US)

(72) Inventors: Daniel Melvin, Larkspur, CA (US); Nataniel Jacobson, Alameda, CA (US)

(73) Assignee: Arris Composites Inc., Berkeley, CA (US)

( * ) Notice: Subject to any disclaimer, the term of this patent is extended or adjusted under 35 U.S.C. 154(b) by 117 days.

(21) Appl. No.: 18/530,234

(22) Filed: Dec. 6, 2023

(65) Prior Publication Data

US 2024/0181684 A1 Jun. 6, 2024

Related U.S. Application Data

(60) Provisional application No. 63/430,547, filed on Dec. 6, 2022.

(51) Int. Cl.
*B29C 43/00* (2006.01)
*B29C 43/50* (2006.01)

(52) U.S. Cl.
CPC ...... *B29C 43/50* (2013.01); *B29C 2043/5015* (2013.01)

(58) Field of Classification Search
CPC ..... B29C 43/42; B29C 43/50; B29C 43/5007; B29C 43/5015; B29C 43/5023; B29C 43/503
See application file for complete search history.

(56) References Cited

U.S. PATENT DOCUMENTS

| | | | | |
|---|---|---|---|---|
| 3,546,221 | A * | 12/1970 | Johnson | B29C 51/14 264/249 |
| 4,515,543 | A | 5/1985 | Hamner | |
| 6,264,454 | B1 * | 7/2001 | Hale | B29C 45/02 264/281 |
| 11,090,883 | B2 | 8/2021 | Pelman et al. | |
| 2004/0134588 | A1 * | 7/2004 | Gerken | B29C 44/005 264/225 |
| 2004/0197432 | A1 * | 10/2004 | Menard | B29C 33/44 425/28.1 |
| 2017/0015024 | A1 | 1/2017 | Suzuki et al. | |
| 2019/0091949 | A1 * | 3/2019 | Yuza | B29C 70/54 |
| 2020/0114596 | A1 | 4/2020 | Davidson et al. | |
| 2022/0266546 | A1 * | 8/2022 | Kawabe | B29C 70/46 |

OTHER PUBLICATIONS

Authorized Officer: Raicher, Gerald, International Search Report and Written Opinion issued in PCT Application No. PCT/US23/82618, Mar. 27, 2024, 11 pp.

* cited by examiner

*Primary Examiner* — Thu Khanh T. Nguyen
(74) *Attorney, Agent, or Firm* — Kaplan Breyer Schwarz LLP

(57) ABSTRACT

A compression-molding tool includes "cutouts" (i.e., recesses) that are machined into the male mold portion of the tool along a boundary edge thereof. During molding, liquefied resin and fibers fill the cutouts, forming "ejection tabs" along the upper surface of the part. The ejection tabs couple the part to the male mold/plunger. The ejection tabs, along with the finished part, remain coupled to the plunger as it is withdrawn from the female mold portion, thereby releasing the finished part from the mold cavity.

17 Claims, 4 Drawing Sheets

EJECTION TABS FOR COMPRESSION MOLDING TOOLS AND PROCESSES

This specification claims priority to U.S. 63/430,547 filed Dec. 6, 2022, and which is incorporated by reference herein.

FIELD OF THE INVENTION

The present invention pertains to compression molding, and more particularly to a way to eject a finished part from a compression mold.

BACKGROUND OF THE INVENTION

Compression molding is a process that can be used to create strong, lightweight, fiber-reinforced composite parts. Conventional starting materials include a polymer resin, often a thermoplastic, and a fiber-based reinforcing material, such as glass fiber or carbon fiber. In operation, the materials are arranged in a mold, the polymer resin is melted, and the contents of the mold are subjected to high pressure. After a period of time at temperature and pressure, the mold is cooled, pressure is released, and the mold cavity is opened. A finished part results.

Due to the high pressures and differing coefficients of thermal expansion of the composite and material of construction of the mold, the finished part sticks to the mold cavity. Traditionally, ejector pins are used on the cavity side of the molding tool to separate and eject the finished part from the mold.

Although universally used, there are a number of drawbacks to using ejector pins. In particular, due to the high forces required to separate the finished part from the mold, and imperfections in surface continuity between pins and the mold, the pins leave "witness marks" (i.e., impressions) on the finished part at their point of contact. This is rather undesirable since the "cavity side" of the finished part is typically a cosmetic surface of the part.

Furthermore, in order to prevent a large amount of "flash" forming where the ejector pins interface with the mold, the gap tolerances between mold and pin must be very tight. Machining the pins to such tolerances results in significant expense. And of course, each pin adds to the overall parts count of the mold tool, and is potentially an additional point of failure. The pins, and the recesses/holes in which they reside during molding, require cleaning after each molding operation and therefore contribute significantly to tool maintenance and production efficiency.

Moreover, the ejector pin must conform to the surface profile of the mold. In particular, if a mold is contoured at the ejector pin's location, the surface of the pin in contact with the part must be identically contoured. And consider that the contour will only match when the pin has a specific angular orientation. Consequently, the ejector pin must be clocked to fit into its recess correctly, further increasing the cost and complexity of a compression-molding tool.

Of no less consequence is the fact that pins add height to the mold, since the mold must be able to house the pins when they are fully retracted (during molding operations), and provide sufficient support to prevent the pins from buckling or skewing under load. This added height means that the mold is more massive, which equates to more thermal mass. As such, this adds to the time it takes for a mold to heat and cool, therefore increasing molding cycle time.

Currently, no solution exists that enables a compression-molded part to be released from a compression mold without the use of ejector pins.

SUMMARY

Some embodiments of the invention provide a way to release a finished part from a mold without the use of ejector pins in the mold cavity, thereby avoiding the many associated drawbacks thereof, as discussed above.

In accordance with the illustrative embodiment of the invention, "cutouts" (i.e., recesses) are machined into the male mold (i.e., plunger) around at least a portion of a boundary edge of the part-forming surface of the plunger. During molding, liquefied resin and, in preferred embodiments, fibers fill the cutouts, forming "ejection tabs" along the upper surface of the part. The ejection tabs couple the part to the male mold/plunger. The ejection tabs are strong enough along the axis of plunger travel so that as the male mold/plunger is being withdrawn from the female mold/cavity portion, the finished part is pulled with it, releasing it from the mold cavity.

Until the plunger/part fully clears the mold cavity, the ejection tab is "trapped" on one side by the wall defining the mold cavity and on its other side by the cutout that is machined into the plunger. But once the plunger/finished part fully clears the mold cavity, the ejection tab becomes unconstrained on the one side. The ejection tab is designed to be relatively weak in bending, and it is designed as a living hinge. Unconstrained on the one side, the ejection tab is thus readily removed from the ejection cutout by bending it "outward," away from the plunger.

Depending on certain factors, such as the size of the cutouts, the size of the part, and certain geometrical considerations, neat thermoplastic might have insufficient strength to prevent the ejection tabs from snapping off of the newly molded part as the male mold is withdrawn. This may be addressed in several ways. In some of such cases, the number of ejection tabs can be increased if the ejection tabs are observed to break during the withdrawal process. Additionally, or alternatively, the size of the ejection tabs can be increased.

Furthermore, additional strength may be provided to the ejection tabs by incorporating fibers, such as are typically present in a mold for molding parts via applicant's compression-molding processes. In some embodiments, relatively smaller fibers are used. Such fibers can be flowed (via pressure differentials) into the ejection cutouts. Preforms comprising such small fibers can be specifically positioned in the mold so that, during molding, the fibers flow to and fill the ejection cutouts. Such fibers are sized so that in addition to being in the ejection cutout, they extend beyond it to overlap, to some degree, with longer continuous fibers that will form the part, proper. This ensures that the shorter fibers that enter the ejection cutouts are well anchored to the part, thus increasing the integrity of the ejection tabs. The contribution of the fibers to improving the strength of the ejection tabs is a function of the type of fiber, the extent to which the fibers extend fully into the ejection cutout, the fiber-volume-fraction (FVF) within the ejection tab, the extent to which the fibers in the ejection tab extend into the part, and the orientation (angle) of such fibers as they leave the ejection tab and enter the part. In some other embodiments, the free ends of continuous fibers that are sited within the part proper and that are proximal to ejection cutouts "flow" into the cutouts (although the majority of the length of such continuous fibers remain substantially in place within the region of the mold cavity wherein the part is formed).

The ejection tabs, which are akin to "flash" as routinely results during molding processes, are removed during post processing. The tabs can be removed via automated or manual cutting, stamping, or laser removal.

For some parts that are very stiff, ejector pins are used to separate the part from the plunger (as opposed to separating the part from the mold cavity). Even so, the mold height is still significantly reduced, since considerably less travel of the ejector pins is required to remove the part from the plunger than to remove it from a deep mold cavity. Moreover, the plunger-side of a part is typically the non-cosmetic side, so to the extent that the molding tool does include plunger-sited ejector pins, any witness marks generated by the pins will appear on the non-cosmetic side of the part.

In some embodiments, the invention provides a compression-molding tool, comprising: a female-mold portion comprising a mold cavity; and a male-mold portion comprising a plunger, the plunger having at least one ejection cutout disposed along at least a portion of a boundary edge of a part-forming surface of the plunger, wherein: (a) the ejection cutout has a first region that extends a first distance into the plunger, and a second region that extends a second distance into the plunger, wherein the first distance is less than the second distance, and (b) when the molding tool is closed such that the male-mold portion couples to the female-mold portion, the first region provides a passageway between the mold cavity and the second region, thereby enabling liquefied resin to flow from the mold cavity through the first region and into the second region, the first region thus placing the ejection cutout in fluidic communication with the mold cavity.

In some embodiments, the invention provides a method for releasing a compression-molded part from a mold, the method comprising:

providing a molding tool including:

(i) a female-mold portion having a mold cavity, and (ii) a male-mold portion comprising a plunger, the plunger having at least one ejection cutout disposed along at least a portion of a boundary edge of a part-forming surface of the plunger;

placing at least one of a plurality of preforms or a preform charge in the mold cavity and closing the molding tool, the plunger extending into the mold cavity;

liquefying resin in the preforms or the preform charge, and flowing a first portion of the liquefied resin from the mold cavity into the ejection cutout and flowing a second portion of the liquefied resin and fibers throughout the mold cavity;

cooling the molding tool, thereby solidifying the first portion of the resin and the second portion of the resin, wherein the first portion forms an ejection tab in the at least one ejection cutout, and the second portion forms a part, wherein the ejection tab is physically coupled to the part; and withdrawing the plunger from the mold cavity, thereby pulling the part out of the mold cavity without aid of ejector pins.

In some embodiments, the invention provides a method for releasing a part from a compression-molding tool, the method comprising:

providing a compression-molding tool having at least one ejection cutout formed in a male-mold portion of the tool along at least a portion of a boundary edge of a part-forming surface of the male-mold portion;

during compression molding, flowing, into the at least one ejection cutout, a first portion of a liquified resin present in a mold cavity of a female-mold portion of the tool, and flowing, throughout the mold cavity, a second portion of the liquified resin and fibers;

cooling the compression-molding tool, thereby solidifying the first portion of the liquified resin, thereby forming at least one ejection tab, and solidifying the second portion of the liquified resin, thereby forming the part, wherein the ejection tab is coupled to the part and coupled to the male-mold portion; and withdrawing the male-mold portion from the mold cavity, thereby pulling the part out of the mold cavity without aid of ejector pins.

DETAILED DESCRIPTION

Figure 2:
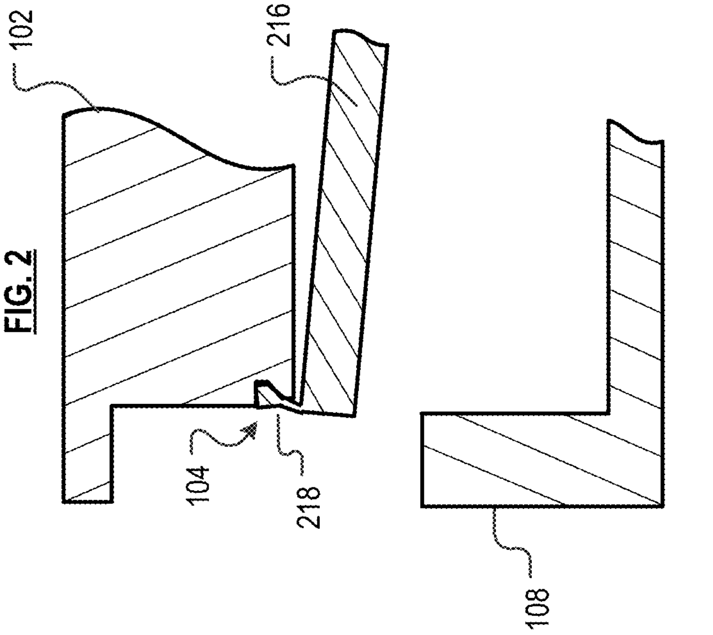
FIG. 2 depicts the removal of a molded part from the molding tool of FIG. 1 via an ejection tab, in accordance with the present teachings.

Definitions. The following terms are defined for use in this description and the appended claims:

"Fiber" means an individual strand of material. A fiber has a length that is much greater than its diameter.

"Fiber bundle" means plural (typically multiples of one thousand) co-aligned fibers.

"Stiffness" in the context of a material means resistance to bending, as measured by Young's modulus.

"Tow" means a bundle of fibers (i.e., fiber bundle), and those terms are used interchangeably herein unless otherwise specified. Tows are typically available with fibers numbering in the thousands: a 1K (1000 fibers) tow, 4K (4000 fibers) tow, 8K (8000 fibers) tow, etc.

"Prepreg" means fibers that are impregnated with resin.

"Towpreg" means a fiber bundle (i.e., a tow) that is impregnated with resin.

"Preform" means an intentionally dimensioned and shaped bundle of fibers, that is impregnated with resin. The preforms are typically sourced from towpreg, but may be the output of resin-impregnation process. Preforms are preferably, but not necessarily, substantially circular/oval in cross section.

"Preform Charge" means an assemblage of preforms that are at least loosely bound together (i.e., tacked) so as to maintain their position relative to one another. Neither the preforms, nor the resulting preform charge, are fully consolidated. Alternatively, a preform charge can be a 3D-printed structure, which may include a single, continuous length of filament, or multiple filaments (i.e., fiber discontinuities in the print path).

"Consolidate", "consolidating", or "consolidation" means, in the present context, that in a grouping of fibers/resin, such as plurality of preforms, void space is removed to the extent possible and as is acceptable for a final part. When consolidated, feed structures lose any unique or individual identity and any previously existing boundaries (between adjacent preforms or other feed structures) are lost. This usually requires significantly elevated pressure, which, for applicant's processes, is accomplished via fluid (e.g., gas, hydraulic oil, etc.) pressurization or the mechanical application of force, and elevated temperature (to soften/melt the resin). The pressure differential attainable via processes that utilize vacuum is wholly inadequate to consolidate the applicant's preform-based feed constituents.

"Partial consolidation" means, in the present context, that in a grouping of fibers/resin, void space is not removed to the extent required for a final part. As an approximation, one to two orders of magnitude more pressure is required for full consolidation versus partial consolidation. As a further very rough generalization, to consolidate fiber composite material to about 80 percent of full consolidation requires only 20 percent of the pressure required to obtain full consolidation.

"Neat" resin or other matrix material means the resin/matrix material has no reinforcing fibers (or other non-matrix materials) present.

"Compatible" means, when used in reference to two or more polymer resins, that the materials will mix and bond with each other.

"About" or "Substantially" means+/−20% with respect to a stated figure or nominal value.

Other definitions may be provided elsewhere in this specification, in context.

Compression Molding. During applicant's compression-molding processes, an assemblage of preforms are consolidated to form a final part. The pressure applied during processing is usually in the range of about 500 psi to about 5000 psi, and temperature, which is a function of the particular resin(s) being used, is typically in the range of about 150 °C to about 400 °C. Once the applied energy/heat has increased the temperature of the (typically) thermoplastic resin above its melt temperature, it is no longer solid and will flow. The resin will then conform to the mold geometry under the applied pressure. Elevated pressure and temperature are typically maintained for a few minutes in accordance with standard compression-molding protocols, so that the resin and fibers are fully consolidated. After the aforementioned dwell at temperature and pressure, the mold is cooled, and then depressurized. Then mold is then opened and the finished part is removed from the mold.

Feed Constituents. For applicant's compression-molding processes, typical feed constituents include a thermoplastic resin and fibers, typically in the form of "preforms."

The individual fibers can have any diameter, which is typically, but not necessarily, in a range of 1 to 100 microns. The individual fibers can have any length, which is application specific, as a function of the part being molded. Individual fibers can include an exterior coating such as, without limitation, sizing, to facilitate processing, adhesion of binder, minimize self-adhesion of fibers, or impart certain characteristics (e.g., electrical conductivity, etc.).

Each individual fiber can be formed of a single material or multiple materials (such as from the materials listed below), or can itself be a composite. For example, an individual fiber can comprise a core (of a first material) that is coated with a second material, such as an electrically conductive material, an electrically insulating material, a thermally conductive material, or a thermally insulating material.

In terms of composition, each individual fiber can be, for example and without limitation, carbon, carbon nanotubes, glass, natural fibers, aramid, boron, metal, ceramic, polymer, synthetic fibers, and others. Non-limiting examples of metal fibers include steel, titanium, tungsten, aluminum, gold, silver, alloys of any of the foregoing, and shape-memory alloys. "Ceramic" refers to all inorganic and non-metallic materials. Non-limiting examples of ceramic fiber include glass (e.g., S-glass, E-glass, AR-glass, etc.), quartz, metal oxide (e.g., alumina), aluminasilicate, calcium silicate, rock wool, boron nitride, silicon carbide, and combinations of any of the foregoing. Non-limiting examples of suitable synthetic fibers include nylon (polyamides), polyester, polypropylene, meta-aramid, para-aramid, polyphenylene sulfide, and rayon (regenerated cellulose).

Any resin—thermoplastic or thermoset—that bonds to itself under heat and/or pressure can be used in conjunction with embodiments of the invention. Although most typically, a thermoplastic resin is used.

Exemplary thermoplastic resins useful in conjunction with embodiments of the invention include, without limitation, acrylonitrile butadiene styrene (ABS), ethylene tetrafluoroethylene (ETFE), fluorinated ethylene propylene (FEP), liquid crystal polymers (LCPs), polyamides (Nylon), polyaryletherketones (PAEK), polybenzimidazole (PBI), polybutylene terephthalate (PBT), polycarbonates (PC), and polycarbonate-ABS (PC-ABS), polyethylene (PE), polyetheretherketone (PEEK), polyetherimide (PEI), polyether sulfones (PES), polyethylene terephthalate (PET), perfluoroalkoxy copolymer (PFA), polyimide (PI), polymethylmethacrylate (PMMA), polyoxymethylene (polyacetals) (POM), polypropylene (PP), polyphosphoric acid (PPA), polyphenylene ether (PPE), polyphenylene oxide (PPO), polyphenylene sulfide (PPS), polyphenylsulfone (PPSU), Polystyrene (PS), polysulfone (PSU), polytetrafluoroethylene (PTFE), polyurethane (PU), polyvinyl chloride (PVC), styrene acrylonitrile (SAN), and styrene butadiene styrene (SBS). A thermoplastic can be a thermoplastic elastomer such as polyurethane elastomer, polyether ester block copolymer, styrenic block copolymer, polyolefin elastomer, polyether block amide, thermoplastic olefins, elastomeric alloys (TPE and TPV), thermoplastic polyurethanes, thermoplastic copolyesters, thermoplastic polyamides, and thermoplastic silicone vulcanizate.

Non-limiting examples of suitable thermosets include araldite, bakelites, epoxies, melamines, phenol/formaldehydes, polyesters, polyhexahydrotriazines, polyimides, polyisocyanates, polyureas, silicones, urea/formaldehydes, vinyl esters, phenolics, and polycarbonates. Suitable thermosets can be prepared as a partially cured B-stage.

In applicant's compression-molding processes, the polymer resin and fiber is typically in the form of "preforms." Each preform include thousands of co-aligned, resin-infused fibers, typically in multiples of one thousand (e.g., 1 k, 10 k, 24 k, etc.). A preform may have any suitable cross-sectional shape (e.g., circular, oval, trilobal, polygonal, etc.), but is most typically circular or oval (i.e., an aspect ratio—width to height—of about 1). Preforms are typically formed from towpreg, but may also be sourced from the output of a resin-impregnation line. To create a preform from towpreg, etc., the bundle of fibers is cut into segments of a desired size and often shaped (e.g., bent, etc.) as well.

For the purposes of molding a part, preforms may be organized into an assemblage having a geometry and shape that is typically close to that of part being molded. In some embodiments, the preforms are placed one-by-one into the mold, creating a "lay-up." In some other embodiments, the preforms are first organized a unitary structure applicant refers to as a "preform charge."

A preform charge comprises a plurality of preforms that are "tacked" together. The term "tacking" references heating to the point of softening (with no more than minimal, localized melting) to effectively join the preforms so as to create a single structure. In some cases, minimal compression is applied for tacking. The preform charge, which is often created in a special fixture, conforms to the shape of the mold (and hence the part), or portions of it. Because the resin in the preforms is not, for the most part, heated to liquefication (the preforms are typically heated to a temperature that is above the heat deflection temperature of the resin, but below the melting point), and the applied pressure is typically low (less than 100 psig and in some cases nothing more than the force of "gravity" acting on the preforms), the preform charge is not fully consolidated and thus could not function as a finished part. But once joined in this fashion, the preforms will not move, thereby maintaining the desired geometry and the specific alignment of each preform in the assemblage. See, e.g., Publ. Pat. App. US2020/0114596 and U.S. patent application Ser. No. 16/877,236.

As used herein, the term "assemblage of preforms" refers to either a lay-up of preforms, as formed by placing preforms one-by-one into a mold cavity, or to a preform charge. The preform charge may alternatively be fabricated by a 3D printer, creating a 3D-printed preform charge.

Figure 1:
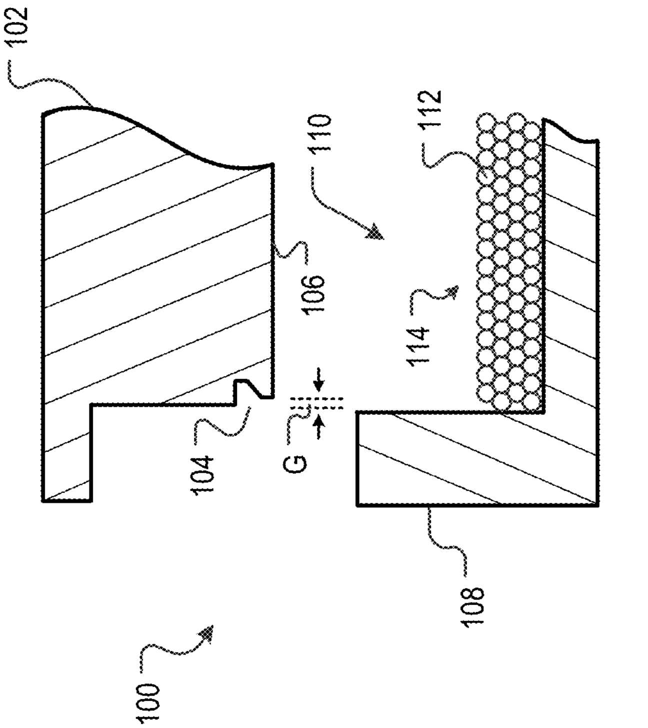
FIG. 1 depicts a molding tool, shown in partial section, in accordance with an illustrative embodiment of the invention.

Ejection Tabs. FIG. 1 depicts a sectional view of a portion of male mold or plunger 102 and a portion of female mold 108 of molding tool 100 in accordance with an illustrative embodiment of the invention. Plunger 102 includes ejection cutout 104, which is located along a portion of the boundary edge of the part-forming surface 106 of plunger 102. In this particular illustration, the bound edge of the part-forming surface 106 is simply the perimeter of the plunger, but that is not always the case. Although a single ejection cutout 104 is depicted in this sectional view, plural ejection cutouts are typically (but not necessarily) present. Ejection cutout 104 is formed by machining, etc. When mold 100 is closed, ejection cutout 104 is in fluidic communication with mold cavity 110 (so that resin/fiber can flow into the ejection cutout). To that end, in the illustrative embodiment, a portion of ejection cutout 104 is recessed, such as illustrated via gap G, to form a passageway that enables such fluidic communication/flow (see, e.g., FIGS. 5A, 5B, feature 519).

In preparation for molding, assemblage 114 of preforms 112 is placed in mold cavity 110. As previously noted, in some embodiments, assemblage 114 is in the form of a preform charge.

During molding, after the resin has been liquefied and pressurized, the resin and (typically) fiber flow into ejection cutout 104. The resin and fiber in ejection cutout 104 will form ejection tab 218 in finished part 216, as depicted in FIG. 2. When relatively shorter fibers are used (i.e., less than about 25 mm) which, by virtue of their short length, can be flowed into ejection cutout 104, they overlap with continuous fibers within the part proper. An overlap of at least 20 percent of the length of the fibers that flow into the ejection cutouts 104 is desirable (see, e.g., FIGS. 7B-7D: desired length is at least 1.2×height "$H_T$" of ejection tab 718). In some alternative embodiments, the end of some of the relatively longer continuous fibers positioned in the region of the mold that forms the part proper can be drawn into a nearby ejection cutout (via the pressure differentials that are created in the mold cavity during compression molding).

At the completion of compression molding, plunger 102 is withdrawn from cavity 110, carrying finished part 216 along with it due to the presence of ejection tab 218, which "hooks" part 216 to plunger 102. This is depicted in FIG. 2.

Because a finished part will normally stick to a mold cavity, force—often quite substantial—is required to eject the part. As a consequence, as plunger 102 is withdrawn from the molding cavity, significant stresses arise within ejection tabs 218. The ejection tabs must be capable of accommodating such stresses without snapping or otherwise deforming (such deformation presents a possibility for ejection tabs 218 to prematurely slide out of ejection cutouts 104). The aforementioned overlap between the fibers within an ejection tab and those within the part reduce the likelihood of snapping/deforming the ejection tabs by facilitating a transfer of stress from the ejection tabs to the part, the latter being far more capable of accommodating such stresses.

In some embodiments, ejection tab 218 is polymer only; no fiber. To accomplish this, fiber-bundle-bearing preforms are replaced by neat polymer filaments in the mold at locations that will be proximate to ejection cutout 104 when plunger 102 is advanced into cavity 110. In some other embodiments, ejection tab 218 includes milled fiber or other fibers having a very short length (smaller than the height of ejection tab 218; see, e.g., FIGS. 7B-7D: <50% of height $H_T$ of ejection tab 718). In either of these scenarios, the resulting ejection tab will be weaker than ejection tabs having continuous fibers as discussed above (i.e., either "flowed" continuous fibers, wherein the length of the fibers is similar to the height of the ejection tab or wherein the end of long fibers from the part extend into the ejection tab). Consequently, when the ejection tab is fiber free or contains only milled fibers, etc., it should be somewhat larger than fiber-bearing ejection tabs, the larger size (i.e., additional resin) compensating for the lower relative strength of such ejection tabs. Furthermore, a different resin may be used for the neat polymer filaments than the resin used in the fiber-bundle-bearing preforms. Such a resin is selected specifically to accommodate the considerable pull stress that the ejection tabs will experience. To the extent two different resins are used, they must be compatible with one another.

After the plunger is withdrawn from the cavity, the finished part is then removed from the plunger. Removal is accomplished in one of several ways as function of a number of factors, including finished part size, finished part geometry, the number and size of the ejection tabs, and the level of automation available. For example, if a part is thin enough, the ejection tabs may be placed on only a portion of the part (e.g., the region in which ejection tabs are present represents between about 25 to 50 percent of the part's perimeter). In such a case, the ejection-tab-free portion of the part will "peel" away from the mold cavity as the plunger is retracted. The part can then be removed from plunger with a wedge or shim, or even pulled off the plunger by hand. If a part is relatively thick, then ejection tabs may be positioned all along the perimeter (e.g., for a circular part requiring 8 ejection tabs, the tabs could be placed at 45-degree increments along the perimeter, etc.). If the thickness of the circular part varies, then the spacing between the ejection tabs at the relatively thicker region of the part may be reduced.

The required number of ejection tabs is a function of the compliance of the part being ejected from the mold. If a part is compliant enough that it can be peeled away from the mold, then a single ejection tab may be used. As used herein, "compliance" is effectively the ratio of the thickness of the part to its length in the direction that the part is being peeled. As used herein, "peel" describes a condition in which the separation of two objects does not occur at once. That is, a first area of the part near the ejection tab separates from the cavity (as the plunger is retracted). With continuing upward motion of the plunger, the part continues to incrementally separate from the mold until it is free. "Cleavage" or "cleaving" of a part from the mold occurs when the part is too stiff to be peeled; that is, the part separates in one motion from the mold. It is possible for cleaving to occur when using a single ejection tab. But in that scenario, the ejection tab would have to be considerably more robust than when the part is removed via peeling. That is, the single ejection tab must be able to overcome the entire adhesive force of the part to the cavity. Absent any empirical/historical data for the number and size of the ejection tabs used for a specific part, the number/size of ejection tabs is best determined by routine experimentation.

It is notable that ejection tabs 218 need to be strong along the axis of travel of plunger 102. Initially, when an ejection tab experiences the greatest pulling force, it is essentially encapsulated or trapped in place since it is completely surrounded by metal; the plunger on one side, the walls of the mold cavity on the other side. As soon as the finished part is lifted along with the plunger, the ejection tab is no longer trapped and is free on the cavity side of the molding tool. The ejection tab is relatively weak in bending (versus the axial direction), due to the relatively thin coupling portion (see, e.g., FIG. 5C: coupling portion 528; that is, the portion of the ejection tab that couples to the part).

Bending the ejection tab 218 outward to release it from ejection cutout 104 is very easy due to this coupling portion, and that is the reason for its inclusion in ejection tab 218. The coupling portion thus functions as a "living hinge." No twisting or rotating of the part is necessary to decouple the part from the plunger. Once the plunger/part is lifted away from the mold cavity, the ejection tab can freely bend and the finished part can be readily popped off of the plunger via peeling or by ejection pins (in the plunger). As such, the coupling portion is designed to be of a thickness and length so that it is easily bent to release the ejection tab when the part is free of the mold cavity. In conjunction with this specification, designing the coupling portion of the ejection tab is within the capabilities of those skilled in the art.

Figure 3B:
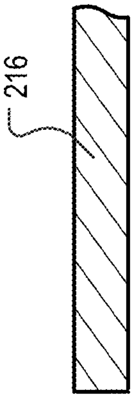
FIG. 3B depicts the molded part of 3A after removal of the ejection tab.
Figure 3A:
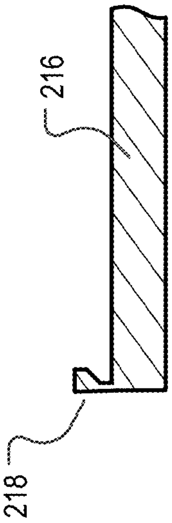
FIG. 3A depicts the molded part, including an appended ejection tab, after removal from the molding tool.

In a further embodiment, the plunger can be equipped with one or more ejection pins that remove the part from the plunger. These ejections pins are typically positioned in the vicinity of the ejection tab(s) so the force imparted by the pins is mainly applied to "popping" ejection tab 218 out of ejection cutout 104. It will be appreciated that such ejection pins will operate with considerably less force than would otherwise be required to remove a part from a mold cavity. FIG. 3A depicts finished part 216 removed from plunger 102.

After part 216 is removed from plunger 102, ejection tabs 218 are removed from the part. This occurs during other post-processing activities, such as flash removal. Ejection tabs 218 may be removed via automated or manual cutting, stamping, laser removal, or the like. FIG. 3B depicts part 216 with ejection tabs removed.

Figure 4A:
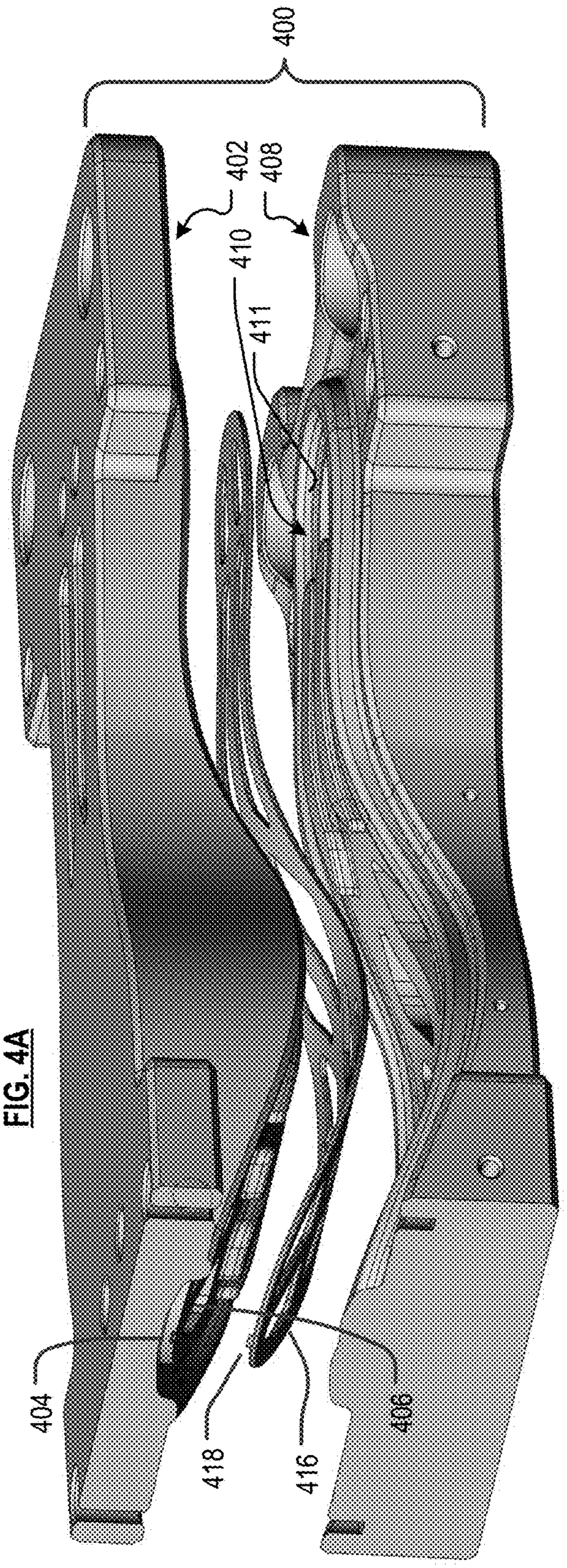
FIG. 4A depicts a molding tool for compression molding a footwear insert, and also depicts the footwear insert formed therefrom.
Figure 4B:
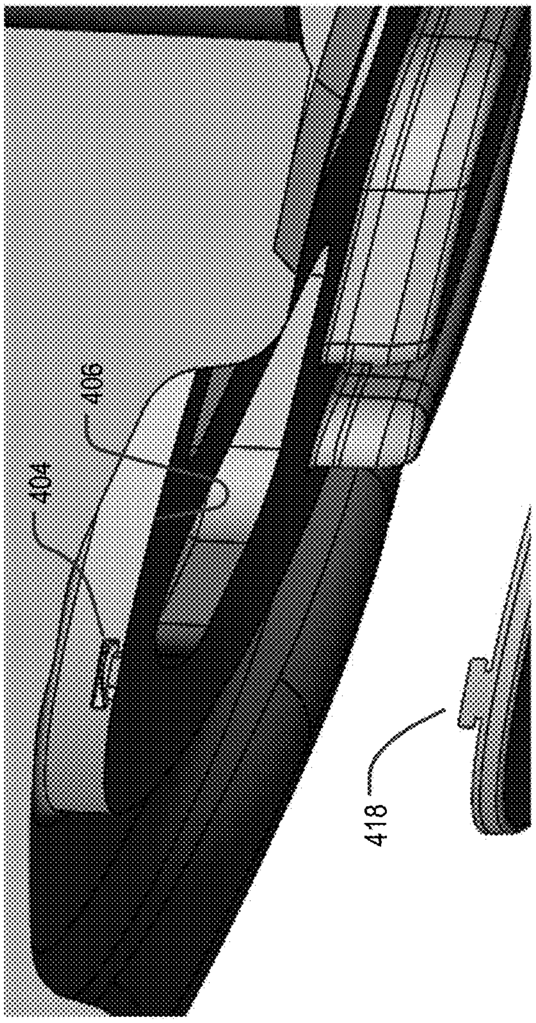
FIG. 4B depicts an enlargement of the FIG. 4A, showing an ejection cutout and an ejection tab.

FIGS. 4A-4B and 5A-5D depict further detail of an ejection tab and/or an ejection cutout and the manner of its integration into a plunger. More specifically, FIG. 4A depicts molding tool 400 for molding a fiber-composite insert for footwear. Molding tool 400 includes plunger 402 and female mold 408 having mold cavity 410. Plunger 402 includes part-forming surface 406, and ejection cutout 404 located along a portion of the boundary edge of part-forming surface 406. Also pictured in FIG. 4A is finished part 416, having ejection tab 418. There would typically be additional ejection cutouts 404 located along the boundary edge of part-forming surface 406; for clarity, only one is depicted. FIG. 4B depicts an enlargement of the FIG. 4A, showing ejection cutout 404 and ejection tab 418.

Figures 5A, 5B, 5C, 5D, 6A, 6B, 6C:
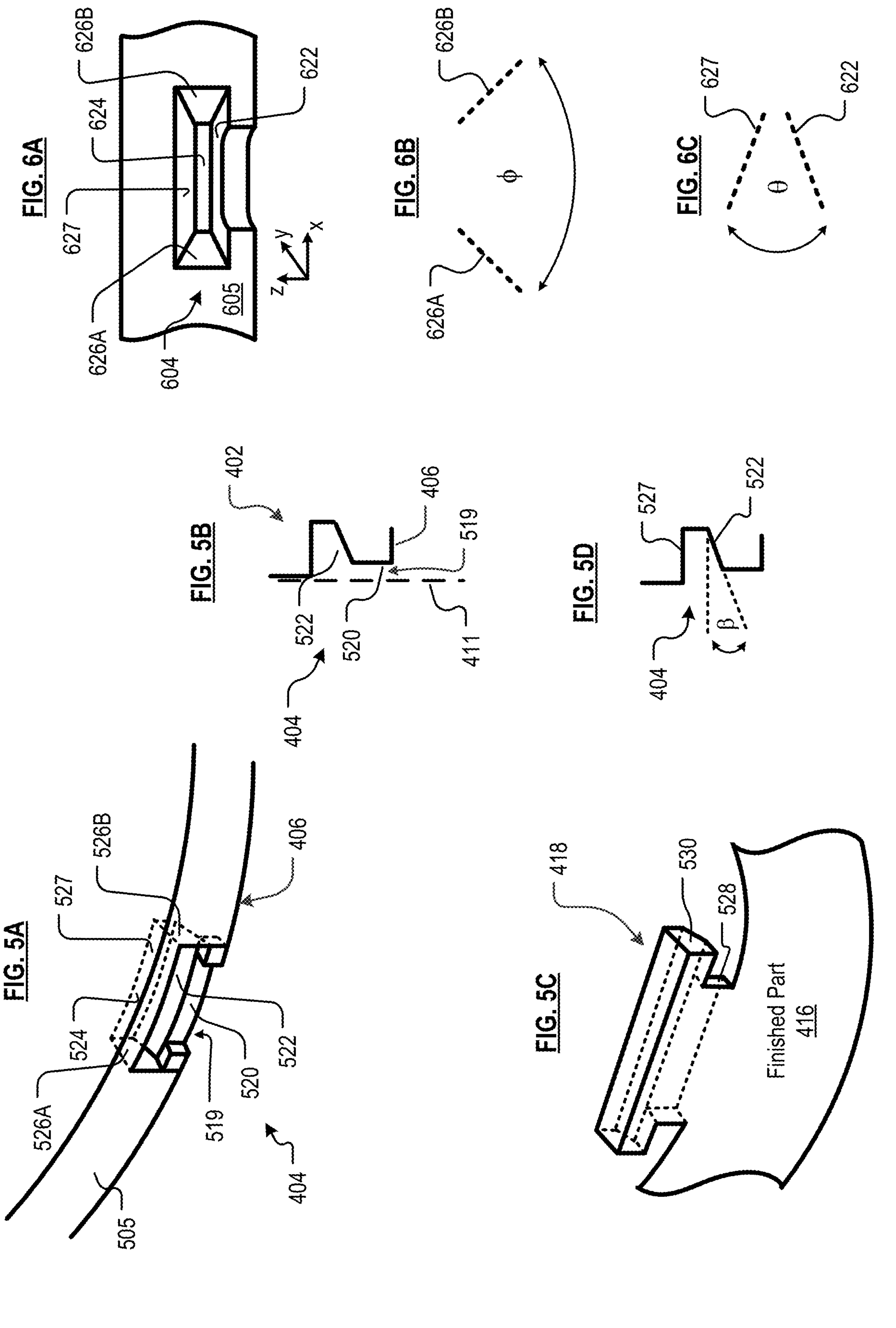
FIGS. 5A, 5B, and 5D depict further detail of an ejection cutout on the plunger of the molding tool of FIGS. 4A and 4B.
FIG. 5C depicts an ejection tab formed from the ejection cutout of 4A, 5A, etc.
FIGS. 6A through 6C depict additional details of an ejection cutout in accordance with the present teachings.

FIG. 5A depicts, via a perspective view, an enlargement of ejection cutout 404. Ejection cutout 404 includes entrance wall 520, bottom surface 522, back wall 524, side walls 526A and 526B, and top surface 527. Wall 520 is recessed or set back within plunger 406 a small distance from boundary-edge wall 505. Due to this recessed position, when plunger 402 is within mold cavity 410, passageway 519 is formed between inside wall 411 of cavity 410 and wall 520, as depicted in the sectional view of FIG. 5B. It is through passageway 519 that liquefied resin and fiber flows into ejection cutout 404.

FIG. 5C depicts ejection tab 418 of finished part 416, as formed from ejection cutout 404 during compression molding. Ejection tab 418 includes hooking portion 530, which hooks the ejection tab to plunger 402, and coupling portion 528, which couples finished part 416 to hooking portion 530. Coupling portion 528 is formed from resin and (typically) fiber that is present in passageway 519, and hooking portion 530 is formed from resin and (typically) fiber present in the cavity defined by surfaces/walls 522, 524, 526A, 526B, and 527.

The lower surface 522 of ejection cutout 404 slopes downward, defining release angle β. This downward slope facilitates release of ejection tab 418 from the ejection cutout. Release angle β is typically (but not necessarily) in the range of about 15 degrees to about 45 degrees.

FIGS. 6A-6C depict a further embodiment of an ejection cutout in accordance with the present teachings. FIG. 6A depicts ejection cutout 604 in perimeter wall 605 of the male portion of a molding tool. In ejection cutout 604, bottom surface 622 slopes downward and, in addition, upper surface 627 slopes upward and side walls 626A and 626B taper outward. This is depicted diagrammatically in FIGS. 6B and 6C.

FIG. 6B depicts the outward taper of sidewalls 626A and 626B, which collectively subtend release-angle ϕ in the X-Y plane. In various embodiments, release angle ϕ is a minimum of 0 degrees to a maximum of about 120 degrees. FIG. 6C depicts release-angle θ in the Z-Y plane, which is the angle subtended between downward-sloping lower surface 622 and upward-sloping upper surface 627. In various embodiments, release angle θ is in a minimum of about 15 degrees to a maximum of about 135 degrees. As to the maximum of 135 degrees, in some embodiments, release-angle θ (FIG. 5D) is 45 degrees, and upper surface 627 is not present. That is, ejection cutout 404 extends upwardly, such as to the upper surface of the plunger.

Various arrangements for facilitating release of the ejection tab from ejection cutout 604 may suitably be used:

- Only lower surface 622 slopes downward; or
- Lower surface 622 slopes downward and upper surface 627 slopes upward, no taper to side walls 626A and 626B; or
- Side walls 626A and 626B taper outward, no slope to lower surface 622 nor upper surface 627; or
- Lower surface 622 slopes downward and side walls 626A and 626B taper outward; or The lower surface 622 slopes downward and upper surface 627 slopes upward, and side walls 626A and 626B taper outward.

Of course, the presence of one of more such sloping/tapered surfaces in ejection cutout 604 will result in complementary sloping/tapered surfaces of the ejection tab formed therefrom.

In practice, the ejection cutout (e.g., ejection cutout 404, 604, etc.) is typically cut using a "T-slot" cutting tool, so the various internal walls of the ejection cutout tend to follow an arc. Use of a T-slot cutting tool will not result in sharp corners within the ejection cutout, but rather radiused corners. So, the sharp corners shown in ejection cutouts 404 and 604, and the resulting sharp-edged ejection tabs, such as ejection tabs 418, and 718 (FIGS. 7B-7D) will more typically have more rounded internal and external corners and edges.

Ejection Cutout/Tab Considerations and Specifics. As previously noted, to eject a part in accordance with the present teachings usually (but not necessarily) requires plural ejection cutouts (and hence plural ejection tabs). Considerations include: (1) the number of tabs required, (2) the placement of the tabs, (3) the dimensions of the tabs, and (4) the geometry of the tabs. And, as previously mentioned, considerations (1)-(4) are a function of the compliance of the part. Some general principles are that:

- The coupling portion is designed to be of an appropriate thickness and length so that it is easily bent to release the ejection tab when the coupled plunger/part is free of the mold cavity.
- Plural ejection cutouts can be equally dimensioned or, alternatively, vary in dimensions such that one or more of the resulting ejection tabs provide a major portion of the overall support required, while the balance of the ejection tabs provide a minor portion of the required support.
- The straighter the fiber alignment between the part and the ejection tab, the greater the ability of ejection tabs to resist forces directed along the plunger's axis of travel.
- A release angle, as results from one or more sloping/tapered walls of the ejection cutout, facilitates removal of the ejection tab from the ejection cutout. See FIGS. 5D, 6A-6C.

EXAMPLES

Example 1. Part 716 depicted in FIGS. 7A through 7D was compression molded and successfully ejected from the mold cavity in accordance with the present invention. For this particular application, part 716 had two ejection tabs $718_1$ and $718_2$ located on opposite sides of part 716. Note that for the side view of FIG. 7B, ejection tab $718_2$ is not shown. Part dimensions and ejection tab dimensions are as follows:

| | |
|---|---|
| Part length, $L_P$ | 50.0 mm |
| Part width, $W_P$ | 50.0 mm |
| Part thickness, $T_P$ | 4.0 mm |
| Ejection tab length, $L_T$ | 14.5 mm |
| Ejection tab height, $H_T$ | 2.0 mm |
| Ejection tab depth, $D_T$ | 1.0 mm |

Additional dimensions are provided for ejection tab 718 below, which are indicative of certain dimensions of the ejection cutouts used to form the ejection tabs. In particular, the additional dimensions are representative of the "entryway" to the ejection cutout, analogous to the dimensions of passageway 519 in FIG. 5B and coupling portion 528 of tab 418 of FIG. 5C. The dimensions of the coupling portion of tabs 718 are as follows:

| | |
|---|---|
| Coupling portion length, $L_{CP}$ | 12.4 mm |
| Coupling portion height, $H_{CP}$ | 1.0 mm |
| Coupling portion depth, $D_{CP}$ | 0.25 mm |

Figures 7A, 7B, 7C, 7D:
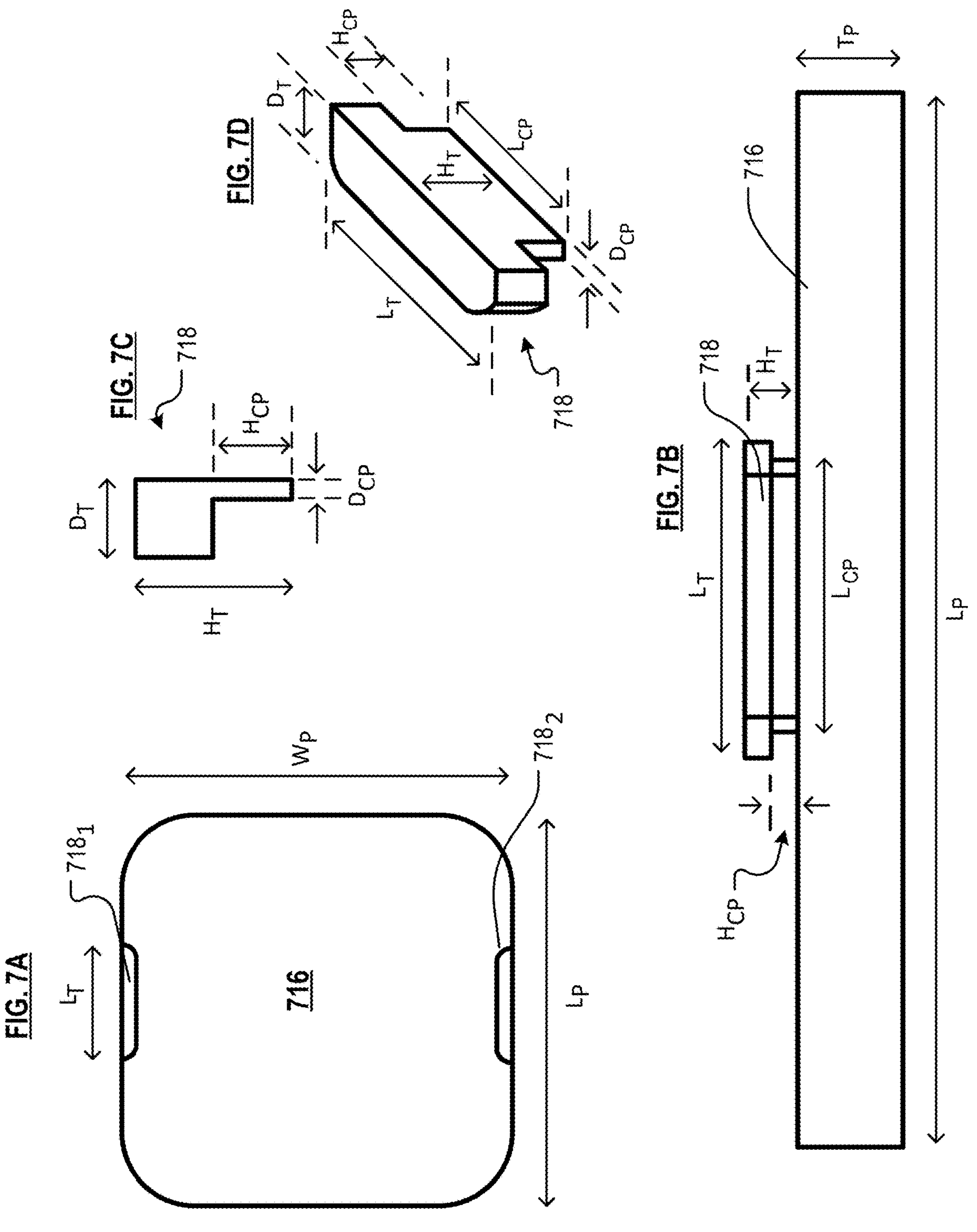
FIGS. 7A through 7D depict a further embodiment of an ejection cut out and ejection tab.

With specific reference to FIGS. 7C and 7D, dimensions $H_{cp}$, $D_{cp}$, and $L_{cp}$ define the dimensions of the coupling portion of ejection tab 718. As previously noted, the coupling portion of the ejection tab functions as a living hinge. As a consequence, the dimensions $D_{cp}$ and $H_{cp}$ must be sized so that the appropriate hinge behavior is achieved. Deflection of the ejection tab is proportional to $H_{cp}^3$, and inversely proportional to $D_{cp}^3$, and inversely proportional to $L_{cp}$. If the coupling portion does not act as a hinge, the ejection tab can break off and remain with the plunger, which is undesirable. It is acceptable for the coupling portion to function partially as a hinge by deflecting and pulling out of the plunger on final ejection of the plunger/part, but then breaking off or shearing a portion of the ejection tab before completely releasing from the plunger. To be avoided is a coupling portion that is stiff to the extent that the ejection tab remains in the plunger after the part the part is removed therefrom. The design and fabrication of an ejection tab that provides the above-described functionality is within the capabilities of those skilled in the art, in conjunction with the present disclosure.

It is notable that for ejection tab 718 of FIGS. 7B and 7D, ejection tab length $L_T$ is depicted as being longer than coupling portion length $L_{cp}$. This is also true for ejection tab 418 (FIGS. 4B and 5C), and would be the case as well for the ejection tab resulting from ejection cutout 604. This form factor is not a requirement; it is simply the result of the practical machining of these tabs and the use of a T-slot cutter tool, as previously mentioned.

Example 2. In another experiment, a part (not depicted) having dimensions 30 centimeters (cm) in length, 8 cm in width, and 5 mm in thickness was compression molded and successfully ejected from the mold cavity in accordance with the present invention. In this embodiment, the part included five ejection tabs, each measuring 4 mm in length, 1 mm in height, and 1 mm in depth. The dimensions of the coupling portion were 2 mm in length, 0.5 mm in height, and 0.3 mm in depth. The ejection tabs were separated by 6 centimeters, such that they were present at about 40 percent of the perimeter of the part (and, correspondingly, the ejection cutouts extended over the same percentage of the perimeter of the plunger).

For any given part, the dimensions of the ejection cutouts/ejection tabs can vary substantially and still provide satisfactory part-ejection performance. It has been found that given an acceptable design, dimensions can vary by about 30 percent and still provide acceptable performance. The dimensions of an acceptable design can be freely enlarged (i.e., the part will be successfully removed from the mold cavity); however, that may complicate the removal of the part from the plunger. And as previously noted, ejection tabs can vary in dimensions and/or geometry around the perimeter of the plunger for sequenced removal. That is, first the ejection tabs that are relatively easier to remove are removed, and then the tabs that are more difficult to remove (i.e., stiffer due to size and/or geometry) are removed.

Using the aforementioned guidelines, one skilled in the art can, via simple experimentation, determine a required number, dimensions, and spacing of ejection tabs, and hence the ejection cutouts.

It is to be understood that the disclosure describes a few embodiments and that many variations of the invention can easily be devised by those skilled in the art after reading this disclosure and that the scope of the present invention is to be determined by the following claims.

What is claimed:

1. A method for releasing a compression-molded part from a mold, the method comprising:

providing a molding tool including:

(i) a female-mold portion having a mold cavity, and (ii) a male-mold portion comprising a plunger, the plunger having at least one ejection cutout disposed along a boundary edge of a part-forming surface of the plunger;

placing at least one of a plurality of preforms or a preform charge in the mold cavity and closing the molding tool, the plunger extending into the mold cavity;

liquefying resin in the preforms or the preform charge, and flowing a first portion of the liquefied resin from the mold cavity into the ejection cutout and flowing a second portion of the liquefied resin throughout the mold cavity;

cooling the molding tool, thereby solidifying the first portion of the resin and the second portion of the resin, wherein the first portion forms an ejection tab in the at least one ejection cutout, and the second portion forms a part, wherein the ejection tab is physically coupled to the part; and withdrawing the plunger from the mold cavity, thereby pulling the part out of the mold cavity solely via the ejection tab.

2. The method of claim 1 comprising removing the ejection tab from the plunger after withdrawing the plunger from the mold cavity.

3. The method of claim 1 wherein, after withdrawing the plunger from the mold cavity, the method comprises extending ejector pins from the plunger to remove the part from the part-forming surface of the plunger.

4. The method of claim 1 comprising removing the ejection tab and the part from the plunger after withdrawing the plunger from the mold cavity.

5. The method of claim 4 wherein after the ejection tab and the part are removed from the plunger, the method comprises removing the ejection tab from the part.

6. The method of claim 1 wherein the plurality of preforms include fiber-bundle-bearing preforms having a plurality of co-aligned fibers, and the preform charge comprises fiber-bundle-bearing preforms having a plurality of co-aligned fibers, the method comprising flowing at least some of the fibers, or portions of said some fibers, into the ejection cutout.

7. The method of claim 6 wherein the fibers that are flowed into the ejection cutout overlap fibers that remain in the mold cavity.

8. The method of claim 6 wherein at least some of the preforms of the plurality thereof, or at least some of the preforms in the preform charge, comprise milled fibers, the method comprising flowing at least some of the milled fibers into the ejection cutout.

9. The method of claim 1 wherein the plurality of preforms or the preform charge include, in addition to fiber-bundle-bearing preforms, neat thermoplastic resin filaments in the mold cavity at locations proximate to the ejection cutout when the plunger is extended into the mold cavity, the ejection tab therefore being fiber free.

10. A method for releasing a part from a compression-molding tool, the method comprising:

providing a compression-molding tool having an ejection cutout formed along a boundary edge of a part-forming surface of a male-mold portion of the tool;

during compression molding, flowing, into the at least one ejection cutout, a first portion of a liquified resin present in a mold cavity of a female-mold portion of the tool, and flowing, throughout the mold cavity, a second portion of the liquified resin;

cooling the compression-molding tool, thereby solidifying the first portion of the liquified resin, thereby forming the ejection tab, and solidifying the second portion of the liquified resin, thereby forming the part, wherein the ejection tab is coupled to the part and coupled to the male-mold portion; and withdrawing the male-mold portion from the mold cavity, thereby pulling the part out of the mold cavity solely via the ejection tab.

11. The method of claim 10 wherein prior to compression molding, placing: (i) a plurality of preforms or (ii) a preform charge in the mold cavity and closing the molding tool.

12. The method of claim 11 wherein some of the preforms in the plurality thereof are fiber-bundle-bearing preforms having a plurality of co-aligned fibers, and some other of the preforms include polymer only.

13. The method of claim 10 wherein the resin is a thermoplastic resin.

14. The method of claim 10 comprising removing the ejection tab from the male-mold portion after withdrawing the male-mold portion from the mold cavity.

15. The method of claim 10 wherein, after withdrawing the male-mold portion from the mold cavity, the method comprises extending ejector pins from the male-mold portion to remove the part therefrom.

16. The method of claim 10 comprising removing the ejection tab and the part from the male-mold portion after withdrawing the male-mold portion from the mold cavity.

17. The method of claim 16 wherein after the ejection tab and the part are removed from the male-mold portion, the method comprises removing the ejection tab from the part.

* * * * *